(12) United States Patent
Yamada et al.

(10) Patent No.: US 9,707,958 B2
(45) Date of Patent: Jul. 18, 2017

(54) WORK VEHICLE AND METHOD FOR CONTROLLING SAME

(71) Applicant: KOMATSU LTD., Tokyo (JP)

(72) Inventors: Kenichi Yamada, Fujisawa (JP); Shunsuke Miyamoto, Atsugi (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/903,651

(22) PCT Filed: Jan. 14, 2015

(86) PCT No.: PCT/JP2015/050749
§ 371 (c)(1),
(2) Date: Jan. 8, 2016

(87) PCT Pub. No.: WO2015/108055
PCT Pub. Date: Jul. 23, 2015

(65) Prior Publication Data
US 2016/0167647 A1 Jun. 16, 2016

(30) Foreign Application Priority Data
Jan. 15, 2014 (JP) .................. 2014-005026

(51) Int. Cl.
*B60W 30/02* (2012.01)
*F16H 61/04* (2006.01)
(Continued)

(52) U.S. Cl.
CPC ............ *B60W 30/02* (2013.01); *B60W 10/10* (2013.01); *B60W 10/18* (2013.01); *B60W 10/30* (2013.01);
(Continued)

(58) Field of Classification Search
CPC .......... F16H 59/48; F16H 59/18; F16H 59/44; F16H 59/54; F16H 61/0437;
(Continued)

(56) References Cited

U.S. PATENT DOCUMENTS 6,272,415 B1   8/2001   Tanaka et al.
2002/0035008 A1*  3/2002   Ono .................. F16H 61/66259
                                                                  477/37
(Continued)

FOREIGN PATENT DOCUMENTS

CN   101835968 A   9/2010
CN   101855478 A   10/2010
(Continued)

OTHER PUBLICATIONS

The International Search Report for the corresponding international application No. PCT/JP2015/050749, issued on Apr. 21, 2015.
(Continued)

*Primary Examiner* — Yuen Wong
(74) *Attorney, Agent, or Firm* — Global IP Counselors, LLP

(57) ABSTRACT

A control unit in a work vehicle executes an automatic downshift for shifting a speed range of a transmission to the speed range at a lower speed than a current speed range. The control unit determines the execution of the automatic downshift on the basis of automatic downshift conditions. The automatic downshift conditions include whether the operating amount of the accelerator operating member is equal to or greater than a predetermined accelerator threshold, whether the vehicle speed is less than a predetermined speed threshold, and whether the acceleration is equal to or less than a predetermined acceleration threshold.

6 Claims, 6 Drawing Sheets

(51) Int. Cl.
*B60W 10/10* (2012.01)
*B60W 10/18* (2012.01)
*B60W 10/30* (2006.01)
*E02F 3/28* (2006.01)
*E02F 9/20* (2006.01)
*F16H 59/18* (2006.01)
*F16H 59/44* (2006.01)
*F16H 59/54* (2006.01)
*F16H 59/48* (2006.01)

(52) U.S. Cl.
CPC .............. *E02F 3/283* (2013.01); *E02F 9/202* (2013.01); *E02F 9/2079* (2013.01); *F16H 61/0437* (2013.01); *B60W 2300/17* (2013.01); *B60W 2540/10* (2013.01); *B60W 2710/10* (2013.01); *B60W 2710/18* (2013.01); *B60W 2710/30* (2013.01); *F16H 59/18* (2013.01); *F16H 59/44* (2013.01); *F16H 59/48* (2013.01); *F16H 59/54* (2013.01)

(58) Field of Classification Search
CPC .............. B60W 2710/10; B60W 10/10; B60W 2710/30; B60W 2710/18; B60W 2540/10; B60W 2300/17; B60W 30/02; B60W 10/30; B60W 10/18; E02F 9/202; E02F 3/283; E02F 9/2079
See application file for complete search history.

(56) References Cited

U.S. PATENT DOCUMENTS

| | | |
|---|---|---|
| 2010/0197459 A1 | 8/2010 | Yamaguchi et al. |
| 2010/0262353 A1 | 10/2010 | Hyodo et al. |
| 2012/0089307 A1 | 4/2012 | Hyodo et al. |

FOREIGN PATENT DOCUMENTS

| | | | |
|---|---|---|---|
| CN | 102803023 A | | 11/2012 |
| JP | 2001-4017 A | | 1/2001 |
| JP | 2002-161976 A | | 6/2002 |
| JP | 2011001712 A | * | 1/2011 |
| WO | 2008/120546 A1 | | 10/2008 |

OTHER PUBLICATIONS

Office Action for the corresponding Chinese application No. 201580001297.6, issued on Aug. 24, 2016.

\* cited by examiner

WORK VEHICLE AND METHOD FOR CONTROLLING SAME

CROSS-REFERENCE TO RELATED APPLICATIONS

This application is a U.S. National stage application of International Application No. PCT/JP2015/050749, filed on Jan. 14, 2015. This U.S. National stage application claims priority under 35 U.S.C. §119(a) to Japanese Patent Application No. 2014-005026, filed in Japan on Jan. 15, 2014, the entire contents of which are hereby incorporated herein by reference.

BACKGROUND

Field of the Invention

The present invention relates to a work vehicle and method for controlling the work vehicle.

Background Information

A work vehicle, such as a wheel loader, has an automatic downshift function. When predetermined conditions are met, the automatic downshift function enables the speed range of the transmission to be automatically shifted to a speed range lower than the current speed range.

In the work vehicle described in International Publication WO 2008/120546, for example, the speed range is automatically shifted from the second speed or higher to the first speed when the hydraulic pressure of the boom cylinder is higher than the predetermined standard value, the height of the boom is lower than a predetermined height, and the vehicle speed is equal to or less than a predetermined speed. As a result, when a work vehicle traveling at the speed range at or above the second speed is carrying out excavating work, the speed range is automatically shifted to the first speed.

SUMMARY

However, there is a problem that a delay in the execution of the automatic downshift occurs with the determination method of the above-mentioned automatic downshift based on the hydraulic pressure of the boom cylinder, the height of the boom, and the vehicle speed. For example, to prevent a false determination, the predetermined speed is preferably a small value as possible. As a result, a state in which the vehicle speed falls due to the work vehicle plunging into a mound of dirt when starting the excavating work can be determined with higher accuracy. However, when the predetermined speed is set to a small value, the execution of the automatic downshift is not determined until the vehicle speed is low enough. As a result, a delay in the execution of the automatic downshift occurs.

An object of the present invention is to provide a work vehicle in which the false determination of an automatic downshift is suppressed and the determination can be made quickly, and a method for controlling the work vehicle.

A work vehicle according to a first exemplary embodiment of the present invention is equipped with an engine, a hydraulic pump, a work implement, a travel device, a transmission, an accelerator operating member, an accelerator operating amount detecting unit, an vehicle speed detecting unit, an acceleration detecting unit, and a control unit. The hydraulic pump is driven by the engine. The work implement is driven by hydraulic fluid discharged from the hydraulic pump. The travel device is driven by the engine. The transmission transmits driving power from the engine to the travel device. The accelerator operating amount detecting unit detects an operating amount of the accelerator operating member. The vehicle speed detecting unit detects the vehicle speed. The acceleration detecting unit detects acceleration of the vehicle. The control unit executes an automatic downshift for shifting the speed range of the transmission to a speed range at a lower speed than the current speed range. The control unit determines the execution of the automatic downshift on the basis of automatic downshift conditions. The automatic downshift conditions include the fact that the operating amount of the accelerator operating member is equal to or greater than a predetermined accelerator threshold, the fact that the vehicle speed is less than a predetermined speed threshold, and the fact that acceleration is equal to or less than a predetermined acceleration threshold.

The execution of the automatic downshift is determined according to the operating amount of the accelerator operating member and the acceleration of the vehicle as well as the vehicle speed in the work vehicle according to the present exemplary embodiment. As a result, the state of the work vehicle can be determined with greater accuracy. For example, the fact that the acceleration of the vehicle is small regardless of whether the accelerator operating member is being operated to a large degree signifies that the work vehicle has plunged into a dirt mound for performing excavating work, and the acceleration is insufficient because the tractive force is insufficient. In this case, the automatic downshift can be executed appropriately in the work vehicle according to the present exemplary embodiment. Moreover, because a false determination of the automatic downshift can be suppressed due to the operating amount of the accelerator operating member and the acceleration of the vehicle, the speed threshold does not have to be set at an overly small value for preventing a false determination. As a result, the automatic downshift determination can be made quickly.

The automatic downshift conditions preferably further include the fact that the work implement is in a predetermined work posture. In this case, the posture taken by the work implement during work in which a slow speed range is required is set to the predetermined work posture whereby the execution of the automatic downshift can be determined with greater accuracy.

The work vehicle preferably is further equipped with a brake device driven by hydraulic pressure. The automatic downshift conditions further include the fact that the pressure of the hydraulic fluid supplied to the brake device is less than a predetermined brake threshold. In this case, the automatic downshift can be executed with even greater accuracy due to the detection that the operator does not intend to use the brake device.

The automatic downshift conditions preferably include the fact that the operating amount of the accelerator operating member is equal to or greater than a predetermined first accelerator threshold and the acceleration is a value corresponding to a deceleration. For example, when a value corresponding to the acceleration is positive, a value corresponding to the deceleration is negative. For example, when the predetermined acceleration threshold is set to a negative value and the acceleration is equal to or less than the predetermined acceleration threshold, the acceleration is determined as a value corresponding to deceleration. In this case, the automatic downshift is executed while the work vehicle is decelerating regardless of whether the accelerator operating member is being operated. This state signifies, for example, that the work vehicle is decelerating due to insufficient tractive force when the work vehicle is beginning to plunge into the dirt mound without the accelerator operating member being operated to a large degree. In this way, an appropriate state for executing the automatic downshift can be determined with greater accuracy.

The automatic downshift conditions preferably include the fact that the operating amount of the accelerator operating member is equal to or greater than a second accelerator threshold that is greater than the first accelerator threshold and the acceleration is a value corresponding to an acceleration. In this case, the predetermined acceleration threshold is set to a positive value for example. The fact that the acceleration is a value corresponding to an acceleration but is equal to or less than the predetermined acceleration threshold signifies that although the work vehicle is not decelerating, the work vehicle cannot accelerate sufficiently. Therefore, the automatic downshift is executed while the work vehicle is not accelerating sufficiently regardless of whether the accelerator operating member is being operated to a large degree. This state signifies, for example, that the work vehicle is not accelerating sufficiently due to insufficient tractive force when the work vehicle is plunging into the dirt mound regardless of whether the accelerator operating member being operated to a large degree. In this way, an appropriate state for executing the automatic downshift can be determined with greater accuracy.

A control method for a work vehicle according to another exemplary embodiment of the present invention is a control method for a work vehicle equipped with an engine, a hydraulic pump, a work implement, a travel device, a transmission, and an accelerator operating member. The hydraulic pump is driven by the engine. The work implement is driven by hydraulic fluid discharged from the hydraulic pump. The travel device is driven by the engine. The transmission transmits driving power from the engine to the travel device. The control method according to the present exemplary embodiment includes first to fifth steps. The first step involves detecting the operating amount of the accelerator operating member. The second step involves detecting the vehicle speed. The third step involves detecting the acceleration of the vehicle. The fourth step involves executing an automatic downshift for shifting the speed range of the transmission to a speed range at a lower speed than the current speed range. The fifth step involves determining the execution of the automatic downshift on the basis of automatic downshift conditions. The automatic downshift conditions include the fact that the operating amount of the accelerator operating member is equal to or greater than a predetermined accelerator threshold, the fact that the vehicle speed is less than a predetermined speed threshold, and the fact that the acceleration is equal to or less than a predetermined acceleration threshold.

The execution of the automatic downshift is determined according to the operating amount of the accelerator operating member and the acceleration of the vehicle as well as the vehicle speed in the control method for the work vehicle according to the present exemplary embodiment. As a result, the state of the work vehicle can be determined with greater accuracy. For example, the fact that the acceleration of the vehicle is small regardless of whether the accelerator operating member is being operated to a large degree signifies that although the work vehicle has plunged into a dirt mound for performing excavating work, the acceleration is insufficient because the tractive force is insufficient. In this case, the automatic downshift can be executed appropriately in the work vehicle according to the present exemplary embodiment. Moreover, because a false determination of the automatic downshift can be suppressed due to the operating amount of the accelerator operating member and the acceleration of the vehicle, the speed threshold for preventing a false determination does not have to be set at an overly small value. As a result, the automatic downshift determination can be made quickly.

In the work vehicle and the control method thereof according to exemplary embodiments of the present invention, a false determination of the automatic downshift can be suppressed and a determination can be made quickly.

DESCRIPTION OF EXEMPLARY EMBODIMENTS

Figure 1:
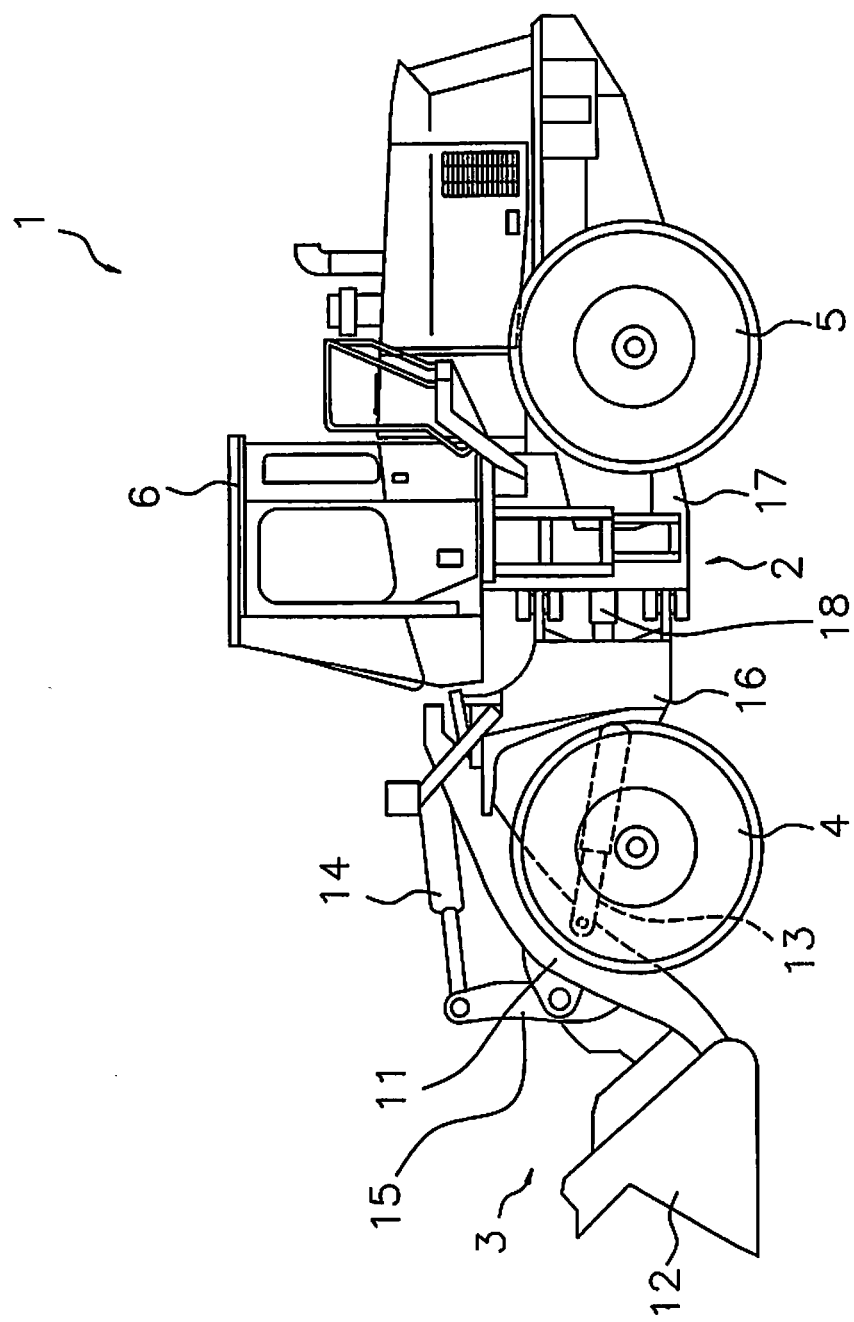
FIG. 1 is a side view of a work vehicle according to an exemplary embodiment.

Exemplary embodiments of the present invention will be explained in detail with reference to the drawings. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 and 5 are attached to the vehicle body frame 2. The work implement 3 is driven by hydraulic fluid from a below-mentioned first hydraulic pump 31 (see FIG. 2). The work implement 3 has a boom 11 and a bucket 12. The boom 11 is mounted on the vehicle body frame 2. The work implement 3 has a boom cylinder 13 and a bucket cylinder 14. The boom cylinder 13 and the bucket cylinder 14 are hydraulic cylinders. One end of the boom cylinder 13 is attached to the vehicle body frame 2. The other end of the boom cylinder 13 is attached to the boom 11. The boom 11 swings up and down due to the extension and contraction of the boom cylinder 13 due to hydraulic fluid from the first hydraulic pump 31. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 with hydraulic fluid from the first hydraulic pump 31.

The operating cabin 6 is attached to the vehicle body frame 2. The operating cabin 6 is mounted on the vehicle body frame 2. A seat for the operator, a below-mentioned operating device 50 (see FIG. 3) and so on are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned second hydraulic pump 32.

Figure 2:
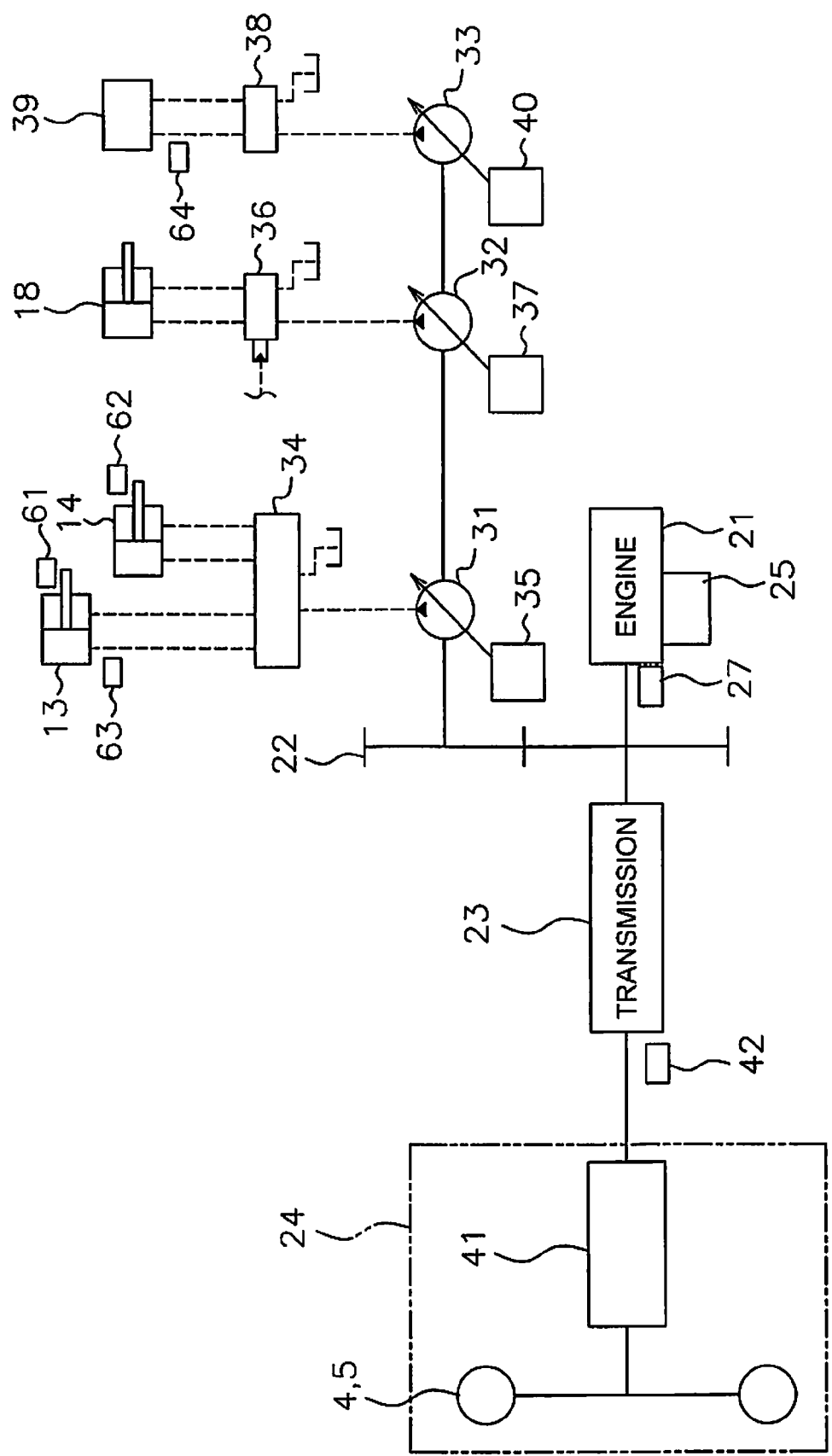
FIG. 2 is a schematic view of a drive system of the work vehicle.

FIG. 2 is a schematic view of a drive system of the work vehicle 1. As illustrated in FIG. 2, the work vehicle 1 has an engine 21, a power take-off device 22 (referred to below as "PTO 22"), a transmission 23, and a travel device 24.

The engine 21 is, for example, a diesel engine. The output of the engine 21 is controlled by adjusting the amount of fuel injected into the cylinders of the engine 21. The adjustment of the amount of fuel is conducted by a below-mentioned control unit 26 (see FIG. 3) controlling a fuel injection device 25 attached to the engine 21. The work vehicle 1 is equipped with an engine rotation speed detecting unit 27. The engine rotation speed detecting unit 27 detects the engine rotation speed and transmits a detection signal indicating the engine rotation speed to the control unit 26.

The work vehicle 1 has the first hydraulic pump 31, the second hydraulic pump 32, and a third hydraulic pump 33. The PTO 22 transmits a portion of the driving power from the engine 21 to the hydraulic pumps 31, 32, and 33. That is, the PTO 22 distributes the driving power from the engine 21 to the hydraulic pumps 31, 32, and 33 and the transmission 23.

The first hydraulic pump 31 is driven by driving power from the engine 21. Hydraulic fluid discharged from the first hydraulic pump 31 is supplied to the boom cylinder 13 and the bucket cylinder 14 through a work implement control valve 34.

The first hydraulic pump 31 is a variable displacement hydraulic pump. The discharge capacity of the first hydraulic pump 31 is changed by changing the tilt angle of a skew plate or an inclined shaft of the first hydraulic pump 31. A first capacity control device 35 is connected to the first hydraulic pump 31. The first capacity control device 35 is controlled by the control unit 26 and changes the tilt angle of the first hydraulic pump 31. As a result, the discharge flow rate of the first hydraulic pump 31 is controlled by the control unit 26.

The second hydraulic pump 32 is driven by driving power from the engine 21. Hydraulic fluid discharged from the second hydraulic pump 32 is supplied to the above-mentioned steering cylinder 18 through a steering control valve 36.

The second hydraulic pump 32 is a variable displacement hydraulic pump. The discharge capacity of the second hydraulic pump 32 is changed by changing the tilt angle of a skew plate or an inclined shaft of the second hydraulic pump 32. A second capacity control device 37 is connected to the second hydraulic pump 32. The second capacity control device 37 is controlled by the control unit 26 and changes the tilt angle of the second hydraulic pump 32. As a result, the discharge capacity of the second hydraulic pump 32 is controlled by the control unit 26.

The third hydraulic pump 33 is driven by driving power from the engine 21. The hydraulic fluid discharged from the third hydraulic pump 33 is supplied to a brake device 39 via a brake control valve 38. The third hydraulic pump 33 is a variable displacement hydraulic pump. The discharge capacity of the third hydraulic pump 33 is changed by changing the tilt angle of a skew plate or an inclined shaft of the third hydraulic pump 33. A third capacity control device 40 is connected to the third hydraulic pump 33. The third capacity control device 40 is controlled by the control unit 26 and changes the tilt angle of the third hydraulic pump 33. As a result, the discharge flow rate of the third hydraulic pump 33 is controlled by the control unit 26.

The PTO 22 transmits a portion of the driving power from the engine 21 to the transmission 23. The transmission 23 transmits the driving power from the engine 21 to the travel device 24. The transmission 23 changes speeds and outputs the driving power from the engine 21.

The transmission 23 is, for example, an electric-mechanical transmission (EMT) having a planetary gear mechanism and an electric motor connected to a rotating element of the planetary gear mechanism. Alternatively, the transmission 23 may be a hydraulic-mechanical transmission (HMT) having a planetary gear mechanism and a hydraulic motor connected to a rotating element of the planetary gear mechanism. The speed ratio of the transmission 23 can be continuously changed by controlling the motor in the EMT or the HMT. Alternatively, the Transmission 23 may be a torque converter transmission having a torque converter and a multi-stage speed changing device. Alternatively, the transmission 23 may be a hydrostatic transmission (HST).

The travel device 24 has an axle 41 and the traveling wheels 4 and 5. The axle 41 transmits driving power from the transmission 23 to the traveling wheels 4 and 5. Consequently the traveling wheels 4 and 5 rotate. The work vehicle 1 is equipped with a vehicle speed detecting unit 42. The vehicle speed detecting unit 42 detects the rotation speed (referred to below as "output rotation speed") of an output shaft of the transmission 23. The output rotation speed corresponds to the vehicle speed and consequently the vehicle speed detecting unit 42 detects the vehicle speed by detecting the output rotation speed. The vehicle speed detecting unit 42 detects the rotating direction of the output shaft of the transmission 23. The rotating direction of the output shaft corresponds to the traveling direction of the work vehicle 1 and consequently the vehicle speed detecting unit 42 functions as a travel direction detecting unit that detects the traveling direction of the work vehicle 1 by detecting the rotating direction of the output shaft. The vehicle speed detecting unit 42 transmits detection signals indicating the output rotation speed and the rotating direction to the control unit 26.

Figure 3:
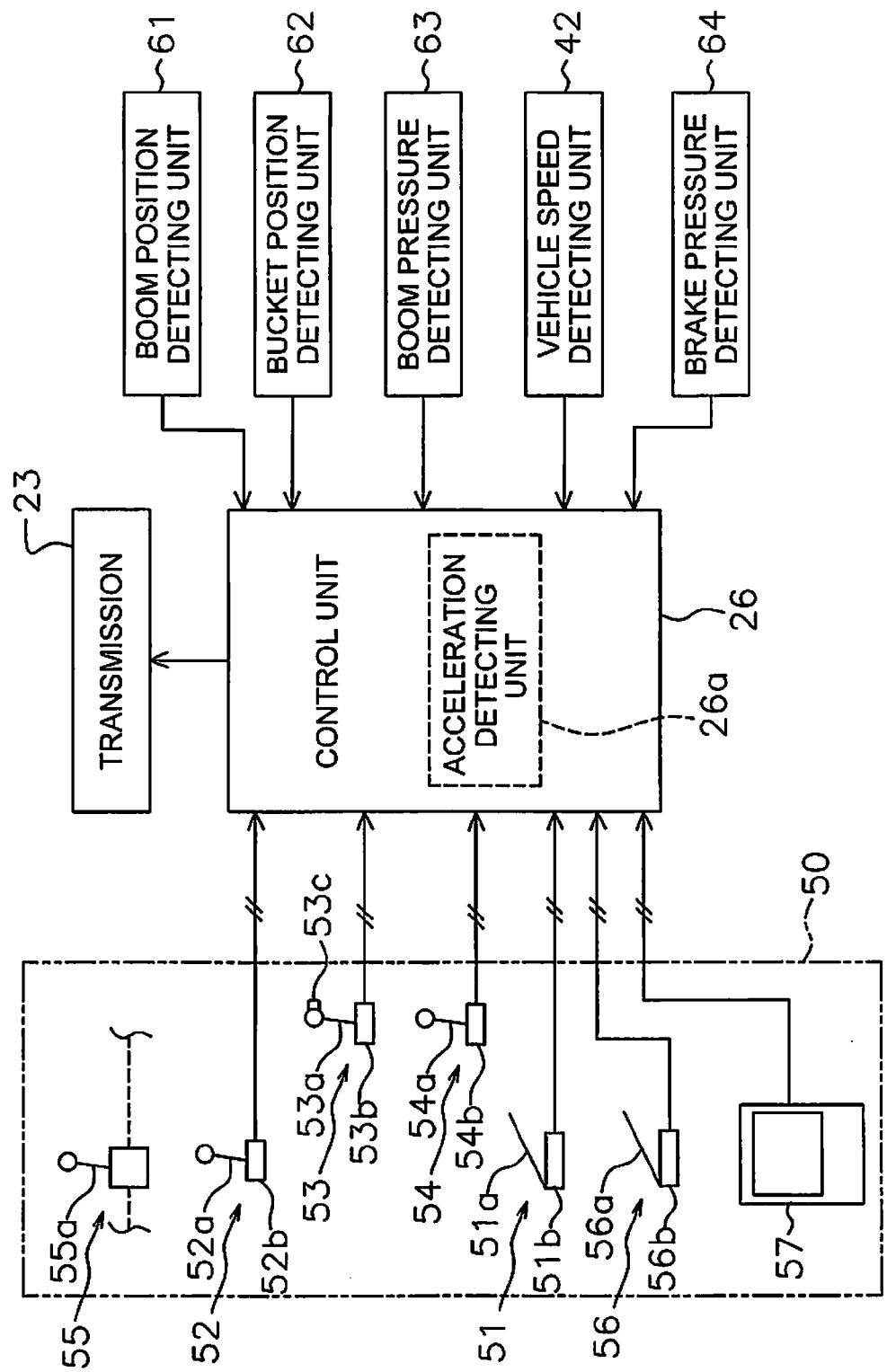
FIG. 3 is a block diagram of a control system of the work vehicle.

FIG. 3 is a block diagram of a control system provided in the work vehicle 1. As illustrated in FIG. 3, the work vehicle 1 has the operating device 50 and the control unit 26. The operating device 50 is operated by the operator. The operating device 50 has an accelerator operating device 51, a work implement operating device 52, a speed change operating device 53, a forward-reverse travel operating device 54 (referred to below as "FR operating device 54"), a steering operating device 55, a brake operating device 56, and a setting device 57.

The accelerator operating device 51 has an accelerator operating member 51a and an accelerator operation detecting unit 51b. The accelerator operating member 51a is operated to set a target rotation speed of the engine 21. The rotation speed of the engine 21 is changed due to the accelerator operating member 51a being operated. The accelerator operation detecting unit 51b detects an operating amount (referred to below as "accelerator operating amount") of the accelerator operating member 51a. The accelerator operation detecting unit 51b transmits a detection signal indicating the accelerator operating amount to the control unit 26.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 26. The work implement operation detecting unit 52b detects an operating amount (referred to below as "work implement operating amount") of the work implement operating member 52a by detecting the position of the work implement operating member 52a.

The speed change operating device 53 has a speed change operating member 53a and a speed change operation detecting unit 53b. The operator is able to select a speed range of the transmission 23 by operating the speed change operating member 53a. The speed change operation detecting member 53b detects the position of the speed change operating member 53a. The position of the speed change operating member 53a corresponds to a plurality of speed ranges, such as a first speed and a second speed and the like. For example, a speed range from a first speed to a fourth speed can be selected with the transmission 23 of the present exemplary embodiment. The speed change operation detecting member 53b outputs a detection signal indicating the position of the speed change operating member 53a to the control unit 26.

The speed change operating device 53 further includes a kick-down switch 53c. The speed change operation detecting member 53b outputs a detection signal indicating the fact that the kick-down switch 53c has been operated to the control unit 26.

The FR operating device 54 has a forward/reverse travel operating member 54a (referred to below as "FR operating member 54a") and a forward/reverse travel position detecting unit 54b (referred to below as "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects the position of the FR operating member 54a. The FR position detecting unit 54b outputs a detection signal indicating the position of the FR operating member 54a to the control unit 26.

The steering operating device 55 has a steering operating member 55a. The steering operating device 55 drives the steering control valve 36 by supplying pilot hydraulic pressure based on an operation of the steering operating member 55a to the steering control valve 36. The steering operating device 55 may drive the steering control valve 36 by converting an operation of the steering operating member 55a to an electrical signal. The operator is able to change the travel direction of the work vehicle 1 to the right or left by operating the steering operating member 55a.

The brake operating device 56 has a brake operating member 56a and a brake operation detecting unit 56b. The operator is able to operate the braking force of the work vehicle 1 by operating the brake operating member 56a. The brake operation detecting unit 56b detects an operating amount (referred to below as "brake operating amount") of the brake operating member 56a. The brake operation detecting unit 56b outputs a detection signal indicating the brake operating amount to the control unit 26.

The setting device 57 is a device for enabling various settings of the work vehicle 1. The setting device 57 is a touch panel-type display input device for example. Alternatively, the setting device 57 may be a device provided with hardware keys and a display. The setting device 57 outputs an input signal indicating an input setting to the control unit 26. The setting device 57 also displays various types of information of the work vehicle 1 in response to a command signal from the control unit 26.

The work vehicle 1 has a boom position detecting unit 61 and a bucket position detecting unit 62. The boom position detecting unit 61 detects a position of the boom 11. For example, the boom position detecting unit 61 detects a position of the boom 11 by detecting the angle of the boom 11. The boom position detecting unit 61 may be a sensor for directly detecting the angle of the boom 11. Alternatively, the boom position detecting unit 61 may detect the angle of the boom 11 by detecting a stroke amount of the boom cylinder 13. The boom position detecting unit 61 outputs a detection signal indicating the position of the boom 11 to the control unit 26.

The bucket position detecting unit 62 detects the position of the bucket 12. For example, the bucket position detecting unit 62 detects the position of the bucket 12 by detecting the angle of the bucket 12. The bucket position detecting unit 62 may also be a sensor for directly detecting the angle of the bucket 12. Alternatively, the bucket position detecting unit 62 may detect the angle of the bucket 12 by detecting the stroke amount of the bucket cylinder 14. The bucket position detecting unit 62 outputs a detection signal indicating the position of the bucket 12 to the control unit 26.

The work vehicle 1 has a boom pressure detecting unit 63. The boom pressure detecting unit 63 detects a bottom pressure of the boom cylinder 13. The bottom pressure of the boom cylinder 13 is the pressure of the hydraulic fluid inside the oil chamber at the bottom side of the boom cylinder 13. When the boom cylinder 13 extends, hydraulic fluid is supplied to the oil chamber at the bottom side of the boom cylinder 13. When the boom cylinder 13 contracts, hydraulic fluid is discharged from the oil chamber at the bottom side of the boom cylinder 13. When the boom 11 is in a holding state, a hydraulic pressure corresponding to a load for holding the boom 11 acts on the oil chamber at the bottom side of the boom cylinder 13. The boom pressure detecting unit 63 inputs a detection signal indicating the bottom pressure of the boom cylinder 13 to the control unit 26.

The work vehicle 1 has a brake pressure detecting unit 64. The brake pressure detecting unit 64 detects the brake pressure. The brake pressure is the pressure of the hydraulic fluid supplied to the brake device 39. The brake pressure detecting unit 64 inputs a detection signal indicating the brake pressure to the control unit 26.

The control unit 26 has a calculation device, such as a central processing unit (CPU), and a memory, such as a RAM or a ROM, and conducts processing for controlling the work vehicle 1. For example, the control unit 26 transmits a command signal indicating a command throttle value to the fuel injection device 25 to achieve the target rotation speed of the engine 21 in response to the accelerator operating amount. The control unit 26 controls the hydraulic pressure supplied to the boom cylinder 13 and the bucket cylinder 14 by controlling the work implement control valve 34 on the basis of the detection signal from the work implement operation detecting unit 52b. As a result, the boom cylinder 13 and the bucket cylinder 14 expand and contract to operate the work implement 3. The control unit 26 controls the hydraulic pressure supplied to the brake device 39 in response to the brake operating amount. As a result, the braking force from the brake device 39 is adjusted.

Moreover, the control unit 26 controls the transmission 23 on the basis of the detection signals from the various detecting units. For example, the control unit 26 switches the rotating direction of the output shaft of the transmission 23 in response to the position of the FR operating device 54. The control unit 26 switches the speed range of the transmission 23 in response to the position of the speed change operating member 53a. When the kick-down switch 53c is operated, the control unit 26 shifts the speed range of the transmission 23 to the first speed.

The control unit 26 executes the automatic downshift when the predetermined automatic downshift conditions are met. The automatic downshift signifies shifting the speed range of the transmission 23 down to the first speed. Processing pertaining to the automatic downshift will be discussed next.

Figure 4:
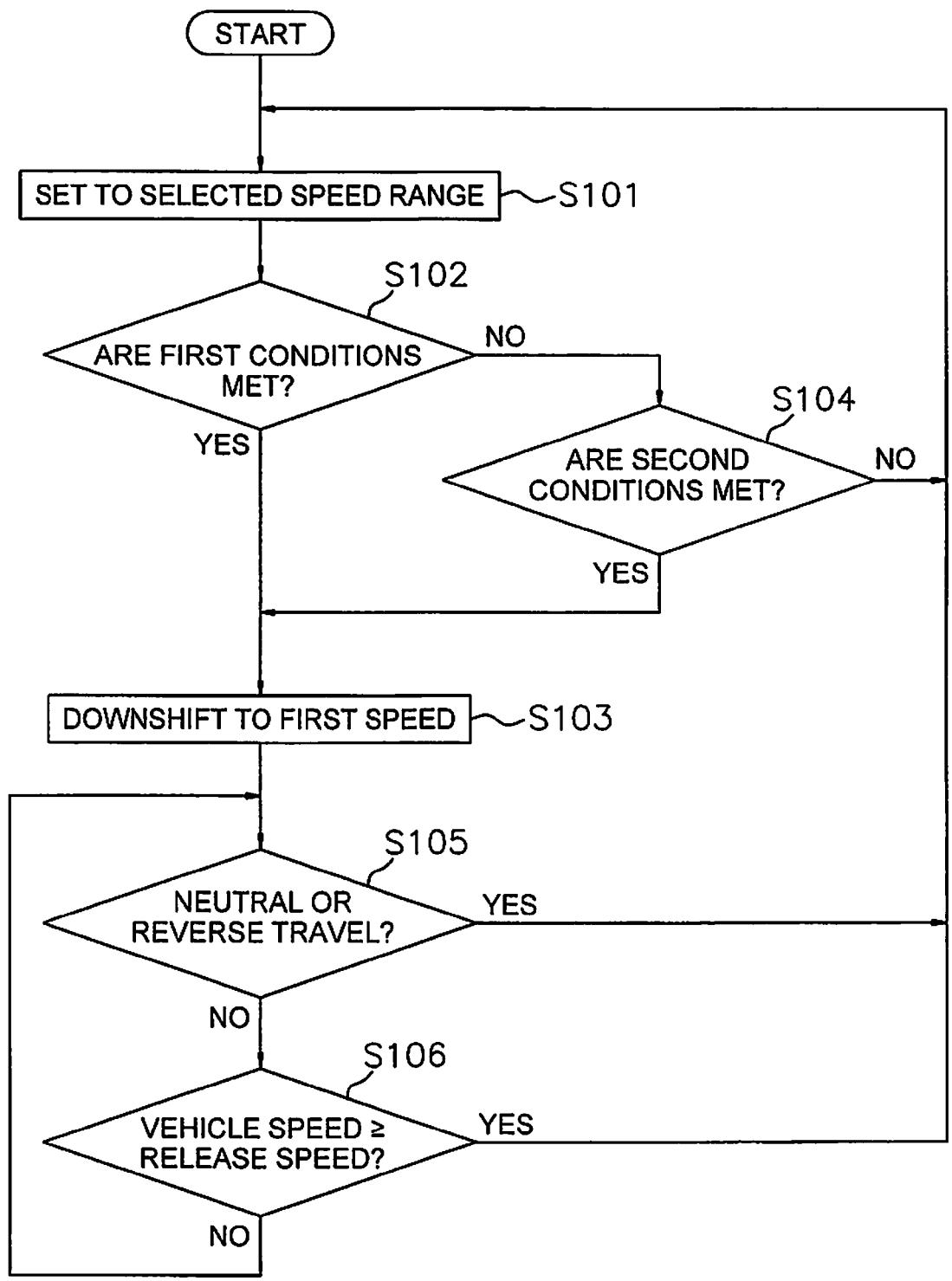
FIG. 4 is a flow chart illustrating automatic downshift processing.

FIG. 4 is a flow chart illustrating automatic downshift processing. As illustrated in FIG. 4, the speed range of the transmission 23 is set to the speed range selected by the speed change operating member 53a in step S101. It is assumed here that the speed range is set to the second speed or higher.

Figure 5:
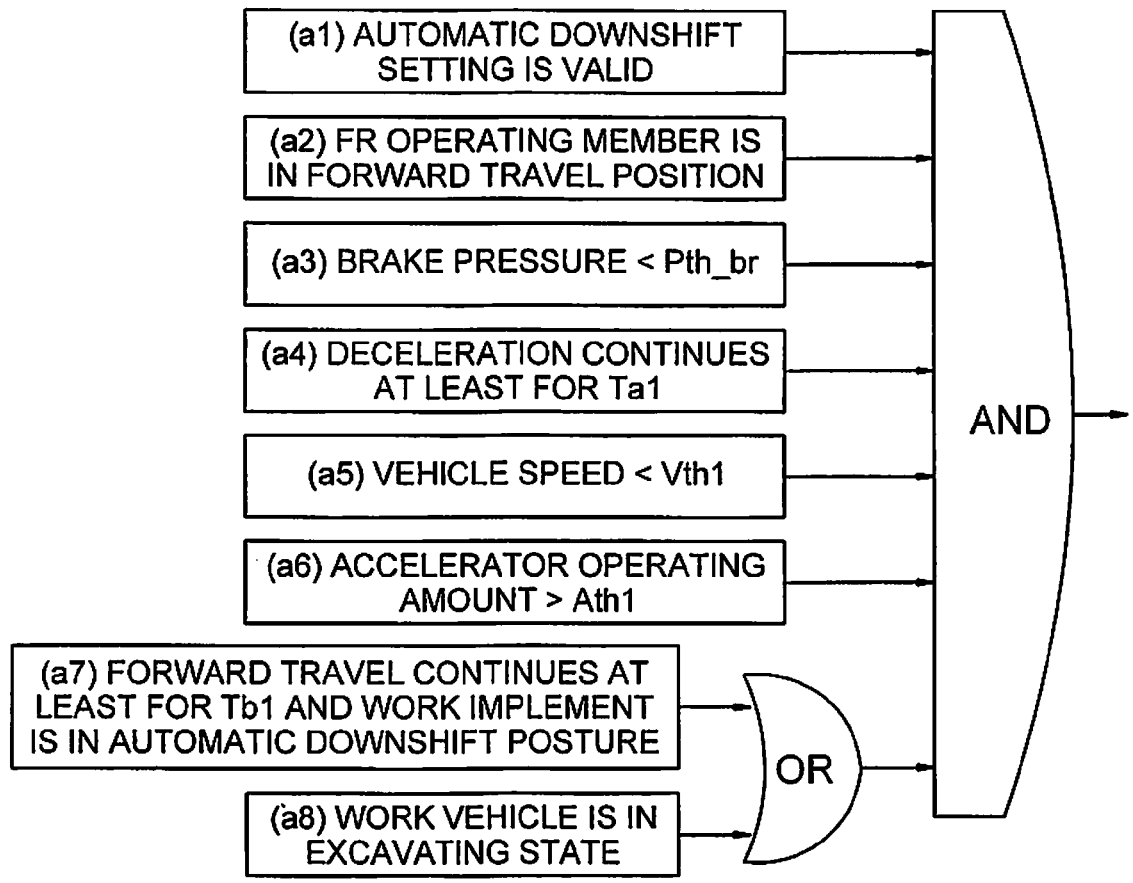
FIG. 5 illustrates first conditions of automatic downshift conditions.

In step S102, a determination is made as to whether the automatic downshift conditions meet first conditions. FIG. 5 illustrates the first conditions. As illustrated in FIG. 5, the first conditions include the fact that the automatic downshift setting is valid (condition a1). When the automatic downshift setting is set by the setting device 57 to a valid setting, the automatic downshift setting is determined as valid.

The first conditions include the fact that the FR operating member 54a is in the forward travel position (condition a2), the fact that the brake pressure is less than a predetermined brake threshold Pth_br (condition a3), the fact that deceleration has continued at least for a predetermined first time period threshold Ta1 (condition a4), the fact that the vehicle speed is less than a predetermined first speed threshold Vth1 (condition a5), and the fact that the accelerator operating amount is greater than a predetermined first accelerator threshold Ath1 (condition a6).

As illustrated in FIG. 3, the control unit 26 has an acceleration detecting unit 26a. The acceleration detecting unit 26a calculates the acceleration of the work vehicle 1 from the vehicle speed detected by the vehicle speed detecting unit 42. When an acceleration sensor is provided in the work vehicle 1, the acceleration sensor may detect the acceleration of the work vehicle 1 as an acceleration detecting unit. When the acceleration of the work vehicle 1 is equal to or less than a predetermined first acceleration threshold, the work vehicle 1 is determined as decelerating. The first acceleration threshold is a negative value.

The first conditions include the fact that the forward travel has continued for at least a first forward travel time period threshold Tb1 and that the work implement 3 is in an automatic downshift posture (condition a7). When the position of the boom 11 is near the ground and the bucket 12 is horizontal, the work implement 3 is determined as being in the automatic downshift posture. The position of the boom 11 being near the ground signifies that the position of the boom 11 detected by the boom position detecting unit 61 is within a predetermined height range that corresponds to being near the ground. The bucket 12 being horizontal signifies that the angle of the bucket 12 is within an angle range where the bottom surface of the bucket 12 is substantially horizontal as illustrated in FIG. 1.

The first conditions include the fact that the work vehicle 1 is in an excavating state (condition a8). When the height of the boom 11 is equal to or less than a predetermined height threshold and the bottom pressure of the boom cylinder 13 is equal to or greater than a predetermined pressure threshold, the work vehicle 1 is determined as being in the excavating state.

When the above-mentioned (condition a1) and the (condition a2) and the (condition a3) and the (condition a4) and the (condition a5) and the (condition a6) and the (condition a7 or condition a8) are met, it is determined that the first conditions are met. When the first conditions are met in step S102 in FIG. 4, the speed range of the transmission 23 is shifted down to the first speed in step S103. That is, the automatic downshift is executed. The routine advances to step S104 when the first conditions are not met in the step S102.

Figure 6:
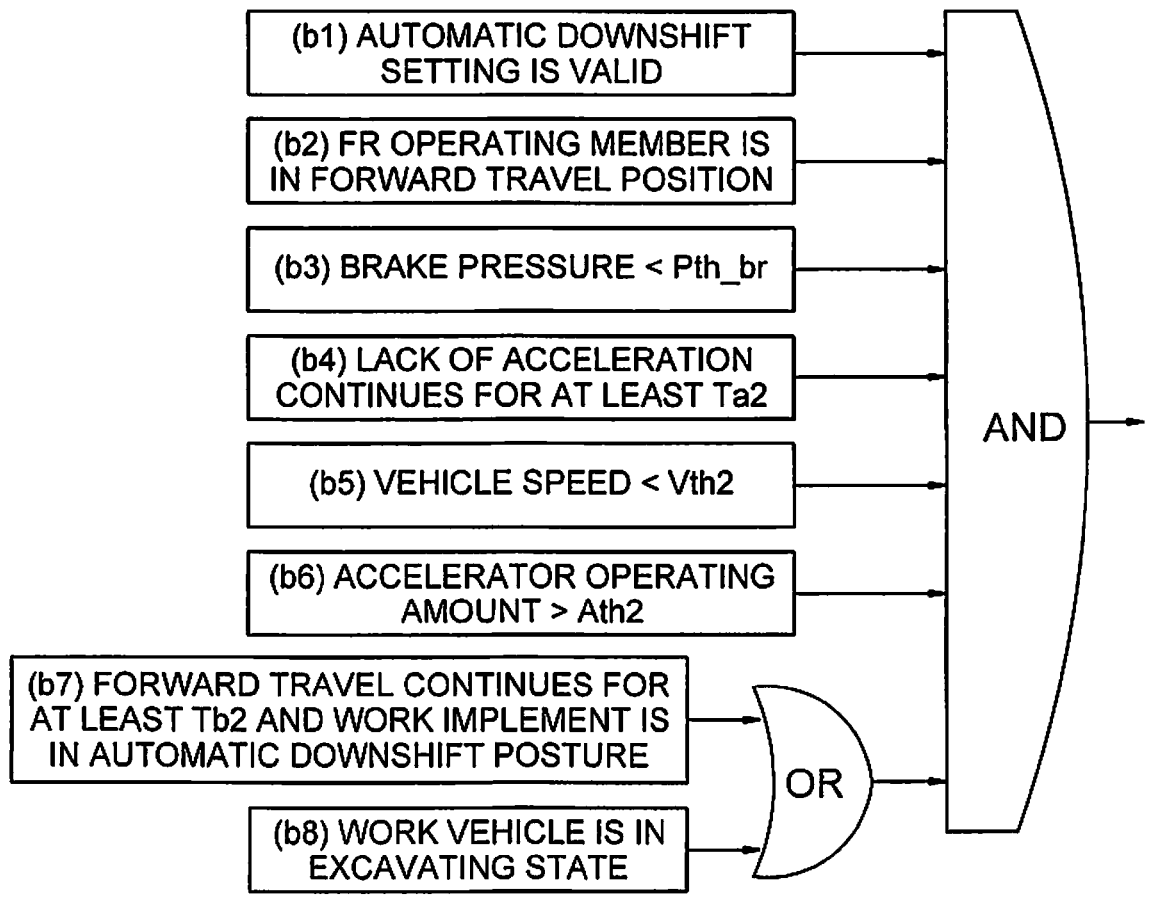
FIG. 6 illustrates second conditions of the automatic downshift conditions.

In step S104, a determination is made as to whether the second conditions of the automatic downshift conditions are met. FIG. 6 illustrates the second conditions. As illustrated in FIG. 6, the second conditions include the fact that the automatic downshift setting is valid (condition b1), the fact that the FR operating member 54a is in the forward travel position (condition b2), and the fact that the brake pressure is less than the predetermined brake threshold Pth_br (condition b3). The conditions b1 to b3 are the same as the above-mentioned conditions a1 to a3 of the first conditions.

The second conditions further include the fact a lack of acceleration has continued for at least a predetermined second time period threshold Ta2 (condition b4), the fact that the vehicle speed is less than a predetermined second speed threshold Vth2 (condition b5), and the fact that the accelerator operating amount is greater than a predetermined second accelerator threshold Ath2 (condition b6). The insufficient acceleration signifies that the acceleration is zero or greater and equal to or less than the predetermined second acceleration threshold. The second acceleration threshold is a positive value. The second time period threshold Ta2 is greater than the first time period threshold Taof the first conditions. The second speed threshold Vth2 is less than the first speed threshold Vth1 of the first conditions. The second accelerator threshold Ath2 is greater than the first accelerator threshold Ath1 of the first conditions.

The second conditions include the fact that the forward travel has continued for at least a second forward travel time period threshold Tb2 and that the work implement 3 is in the automatic downshift posture (condition b7), and the fact that the work vehicle 1 is in the excavating state (condition b8). The second forward travel time period threshold Tb2 is less than the first forward travel time period threshold Tb1 of the first conditions.

When the above-mentioned (condition b1) and the (condition b2) and the (condition b3) and the (condition b4) and the (condition b5) and the (condition b6) and (the condition b7 or the condition b8) are met, it is determined that the second conditions are met. When the second conditions are met in step S104 in FIG. 4, the speed range of the transmission 23 is shifted down to the first speed in step S103. That is, the automatic downshift is executed. The routine returns to step S101 if the second conditions are not met in step S104. That is, the speed range of the transmission 23 is maintained at the speed range selected by the speed change operating member 53a.

In step S105, it is determined whether the position of the speed change operating member 53a is in the neutral position or the reverse travel position. The routine returns to step S101 if the operating position of the speed change operating member 53a is in the neutral position or the reverse travel position. Therefore, the routine returns to step S101 if the position of the speed change operating member 53a is changed from the forward travel position to the neutral position or the reverse travel position.

In step S106, it is determined as to whether the vehicle speed is equal to or greater than a predetermined release speed. The release speed is greater than the above-mentioned first vehicle speed threshold Vth1. The release speed is greater than the above-mentioned second vehicle speed threshold Vth2. When the vehicle speed is equal to or greater than the release speed, the routine returns to step S101.

As described above, the execution of the automatic downshift is determined according to the accelerator operating amount and the acceleration of the work vehicle 1 as well as the vehicle speed in the work vehicle 1 according to the present exemplary embodiment. As a result, the state of the work vehicle 1 can be determined with greater accuracy.

Specifically, the first conditions include the fact that the deceleration has continued at least for a predetermined first time period threshold Ta1 (condition a4), the fact that the vehicle speed is less than a predetermined first speed threshold Vth1 (condition a5), and the fact that the accelerator operating amount is greater than a predetermined first accelerator threshold Ath1 (condition a6). This state is, for example, a state in which the work vehicle 1 is decelerating due to insufficient tractive force when the work vehicle 1 is beginning to plunge into the dirt mound without the accelerator operating member 51a being operated to a large degree. This type of state can be determined accurately and the automatic downshift can be executed in the work vehicle 1 according to the present exemplary embodiment.

The second conditions include the fact that insufficient acceleration has continued for at least a predetermined second time period threshold Ta2 (condition b4), the fact that the vehicle speed is less than the predetermined second speed threshold Vth2 (condition b5), and the fact that the accelerator operating amount is greater than the predetermined second accelerator threshold Ath2 (condition b6). This state is, for example, a state in which the work vehicle 1 is plunging into the dirt mound and the work vehicle 1 is not accelerating sufficiently due to insufficient tractive force regardless of whether the accelerator operating member 53a is being operated to a large degree. This type of state can be determined accurately and the automatic downshift can be executed in the work vehicle 1 according to the present exemplary embodiment.

Moreover, because the false determination of the automatic downshift can be suppressed by considering the accelerator operating amount and the acceleration of the work vehicle 1, the speed thresholds Vth1 and Vth2 for preventing false determinations do not have to be set at overly small values. As a result, the automatic downshift determination can be made quickly.

Although an exemplary embodiment of the present invention has been described so far, the present invention is not limited to the above exemplary embodiments and various modifications may be made within the scope of the invention.

The present invention is not limited to the above-mentioned wheel loader and may be applied to another type of work vehicle, such as a bulldozer, a tractor, a forklift, or a motor grader.

The automatic downshift may include shifting down to a speed range other than the first speed. For example, the automatic downshift may include shifting down from the current speed range to a speed range that is one speed stage lower.

A portion of the conditions included in the above-mentioned first conditions and the second conditions may be omitted or changed. Alternatively, another condition may be added to the first conditions and the second conditions.

The speed range of the transmission is not limited to the first speed to the fourth speed. For example, the speed range of the transmission may be from the first speed to the third speed. Alternatively, the speed range of the transmission may be from the first speed to a speed equal to or greater than the fourth speed.

A work vehicle and a method for controlling the same can be provided in which a false determination of an automatic downshift can be suppressed and the determination can be made quickly according to exemplary embodiments of the present invention.

What is claimed is:

1. A work vehicle comprising:
    an engine;
    a hydraulic pump driven by the engine;
    a work implement driven by hydraulic fluid discharged from the hydraulic pump, the work implement including a boom and a bucket;
    a travel device driven by the engine;
    a transmission that transmits a driving power from the engine to the travel device;
    an accelerator operating member;
    an accelerator operation device, including the accelerator operating member, configured and arranged to detect an operating amount of the accelerator operating member and output an operating amount signal indicating the detected operating amount;
    a vehicle speed detector device configured and arranged to detect a rotation speed and a rotation direction of a rotating part of the work vehicle and output a signal indicating the detected rotation speed and rotation direction; and
    a control unit, including a processor, configured to:
        receive the operating amount signal from the accelerator operation device,
        receive the signal from the vehicle speed detector device,
        compute a vehicle speed and a vehicle acceleration of the work vehicle based on the signal, and
        control the work vehicle by executing an automatic downshift for shifting the transmission from a current speed range to a speed range that is lower than the current speed range, the control unit executing the automatic downshift when the control unit determines that at least a first condition, a second condition, a third condition, and a fourth condition are satisfied, the first condition being that the operating amount of the accelerator operating member is equal to or greater than a predetermined accelerator threshold, the second condition being that the vehicle speed is less than a predetermined speed threshold, and the third condition being that the vehicle acceleration is equal to or less than a predetermined acceleration threshold, the fourth condition being that the work implement is in a predetermined work posture such that the boom is near a ground and the bucket is in a horizontal state.

2. The work vehicle according to claim 1, further comprising
    a brake device driven by hydraulic pressure,
    the control unit executes the automatic downshift when the control unit determines that at least the first condition, the second condition, the third condition, the fourth condition, and a fifth condition are satisfied, the fifth condition being that the hydraulic pressure of hydraulic fluid supplied to the brake device is less than a predetermined brake threshold.

3. The work vehicle according to claim 1, wherein the control unit executes the automatic downshift when the control unit determines that at least the first condition, the second condition, the third condition, the fourth condition, and a fifth condition are satisfied, the fifth condition being that the vehicle acceleration is a value corresponding to a deceleration.

4. A work vehicle comprising:
an engine;
a hydraulic pump driven by the engine;
a work implement driven by hydraulic fluid discharged from the hydraulic pump;
a travel device driven by the engine;
a transmission that transmits a driving power from the engine to the travel device;
an accelerator operating member;
an accelerator operation device, including the accelerator operating member, configured and arranged to detect an operating amount of the accelerator operating member and output an operating amount signal indicating the detected operating amount;
a vehicle speed device configured and arranged to detect a rotation speed and a rotation direction of a rotating part of the work vehicle and output a signal indicating the detected rotation speed and rotation direction; and
a control unit, including a processor, configured to:
receive the operating amount signal from the accelerator operation device,
receive the signal from the vehicle speed device,
compute a vehicle speed and a vehicle acceleration of the work vehicle based on the signal, and
control the work vehicle by executing an automatic downshift for shifting the transmission from a current speed range to a speed range that is lower than the current speed range, the control unit executing the automatic downshift when the control unit determines that at least a first condition, a second condition, a third condition, and either a fourth condition or a fifth condition are satisfied, the first condition being that the vehicle speed is less than a predetermined speed threshold, and the second condition being that the vehicle acceleration is equal to or less than a predetermined acceleration threshold, the third condition being that the work implement is in a predetermined work posture such that the boom is near a ground and the bucket is in a horizontal state, the fourth condition being that the operating amount of the accelerator operating member is equal to or greater than a predetermined first accelerator threshold and the vehicle acceleration is a value corresponding to a deceleration, and the fifth condition being that the operating amount of the accelerator operating member is equal to or greater than a predetermined second accelerator threshold that is greater than the first accelerator threshold and the vehicle acceleration is a value corresponding to an acceleration.

5. A control method for a work vehicle that has an engine, a hydraulic pump driven by the engine, a work implement that has a boom and a bucket and is driven by hydraulic fluid discharged from the hydraulic pump, a travel device driven by the engine, a transmission that transmits a driving power from the engine to the travel device, and an accelerator operating member, the method comprising:

detecting an operating amount of the accelerator operating member;
detecting a vehicle speed of the vehicle;
detecting a vehicle acceleration of the vehicle;
controlling, by a control device that includes a processor, the work vehicle by executing an automatic downshift whereby the transmission is shifted from a current speed range to a speed range that is lower than the current speed range; and
executing, by the control device, the automatic downshift when at least a first condition, a second condition, a third condition, and a fourth condition are satisfied, the first condition being that the operating amount of the accelerator operating member is equal to or greater than a predetermined accelerator threshold, the second condition being that the vehicle speed is less than a predetermined speed threshold, the third condition being that the vehicle acceleration is equal to or less than a predetermined acceleration threshold, and the fourth condition being that the work implement is in a predetermined work posture such that the boom is near a ground and the bucket is in a horizontal state.

6. A work vehicle comprising:
an engine;
a hydraulic pump driven by the engine;
a work implement driven by hydraulic fluid discharged from the hydraulic pump;
a travel device driven by the engine;
a brake device driven by hydraulic pressure;
a transmission that transmits a driving power from the engine to the travel device;
an accelerator operating member;
an accelerator operation device, including the accelerator operating member, configured and arranged to detect an operating amount of the accelerator operating member and output an operating amount signal indicating the detected operating amount;
a vehicle speed device configured and arranged to detect a rotation speed and a rotation direction of a rotating part of the work vehicle and output a signal indicating the detected rotation speed and rotation direction; and
a control unit, including a processor, configured to:
receive the operating amount signal from the accelerator operation device,
receive the signal from the vehicle speed detector device,
compute a vehicle speed and a vehicle acceleration of the work vehicle based on the signal, and
control the work vehicle by executing an automatic downshift for shifting the transmission from a current speed range to a speed range that is lower speed than the current speed range, the control unit executing the automatic downshift when the control unit determines that at least a first condition, a second condition, a third condition, a fourth condition, and either a fifth condition or a sixth condition are satisfied, the first condition being that the vehicle speed is less than a predetermined speed threshold, and the second condition being that the vehicle acceleration is equal to or less than a predetermined acceleration threshold, the third condition being that the work implement is in a predetermined work posture such that the boom is near a ground and the bucket is in a horizontal state, the fourth condition being that the hydraulic pressure of hydraulic fluid supplied to the brake device is less than a predetermined brake threshold, the fifth condition being that the operating amount of the accelerator operating member is equal to or greater than a predetermined first accelerator threshold and the vehicle acceleration is a value corresponding to a deceleration, and the sixth condition being that the operating amount of the accelerator operating member is equal to or greater than a predetermined second accelerator threshold that is greater than the first accelerator threshold and the vehicle acceleration is a value corresponding to an acceleration.

* * * * *